United States Patent [19]

Murphy et al.

[11] 4,330,019
[45] May 18, 1982

[54] METHOD AND APPARATUS FOR SAWING LOGS INTO LENGTHS

[75] Inventors: Peter Murphy; David H. King, both of Delta; Bernard Haeber, Burnaby, all of Canada

[73] Assignee: King, Murphy & Associates, Ltd., Richmond, Canada

[21] Appl. No.: 157,724

[22] Filed: Jun. 9, 1980

[51] Int. Cl.³ ............................................. A01G 23/02
[52] U.S. Cl. .................................... 144/312; 83/368; 83/371; 83/435.1
[58] Field of Search .................. 83/368, 371, 71, 490, 83/808, 471.2, 435.1; 144/2 R, 3 R, 312

[56] References Cited

U.S. PATENT DOCUMENTS

| | | | |
|---|---|---|---|
| 3,459,246 | 8/1969 | O'Hosson | 144/312 |
| 3,554,249 | 1/1971 | Arnelo | 144/312 |
| 3,871,258 | 3/1975 | Hurn | 83/371 |
| 3,885,483 | 5/1975 | Ikeya et al. | 83/368 |
| 3,960,041 | 6/1976 | Warren et al. | 144/312 |
| 4,102,227 | 7/1978 | Simko | 83/368 |
| 4,204,798 | 5/1980 | Warren et al. | 144/312 |

FOREIGN PATENT DOCUMENTS 2842934  4/1980  Fed. Rep. of Germany ...... 144/312

*Primary Examiner*—W. D. Bray
*Attorney, Agent, or Firm*—Townsend and Townsend

[57] ABSTRACT

A sawmill serving to cut logs into lengths which will allow for maximum use of the wood has a support for the log to be sawn. A number of saws are arranged alongside the supported log for individual lateral movement longitudinally of the log. Associated with the support is a locating device for determining the position of the log end relative to a reference datum line extending across the support. An electronic scanner surveys the log as it is delivered to the support and obtains log profile data which is fed to a computer. The computer has a memory in which is stored desirable cutting data as related to the reference datum line and the log profile data. A signal is sent by the computer to each of the saws whereupon the saws take up positions which will result in the log being cut into optimum random lengths.

10 Claims, 5 Drawing Figures

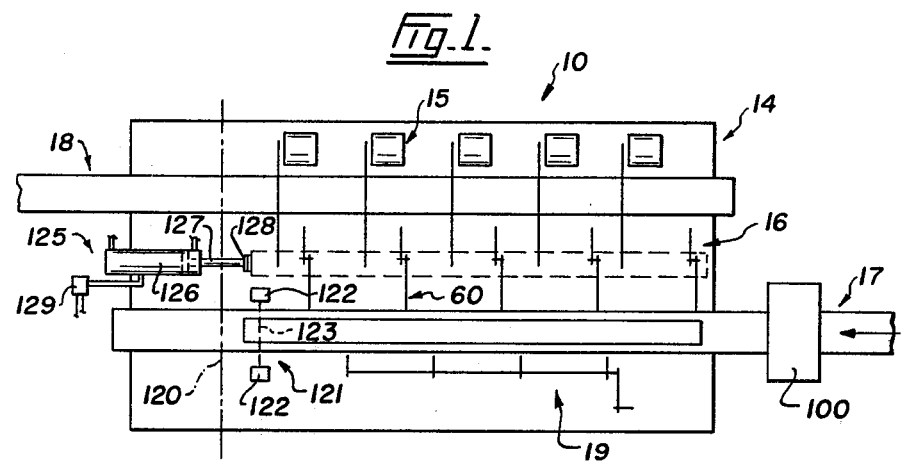
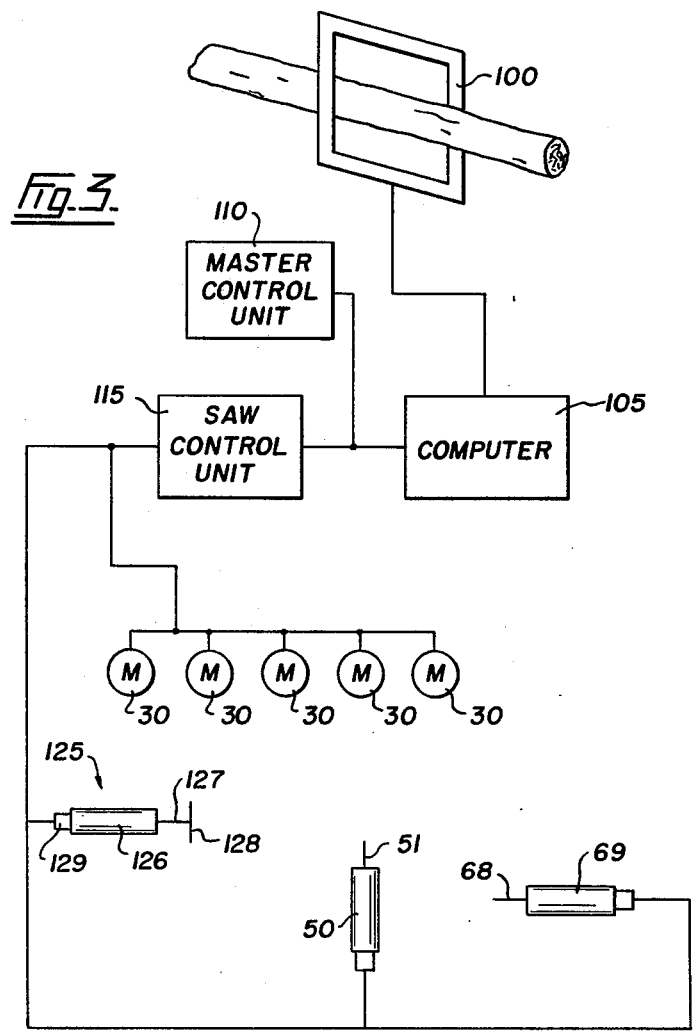

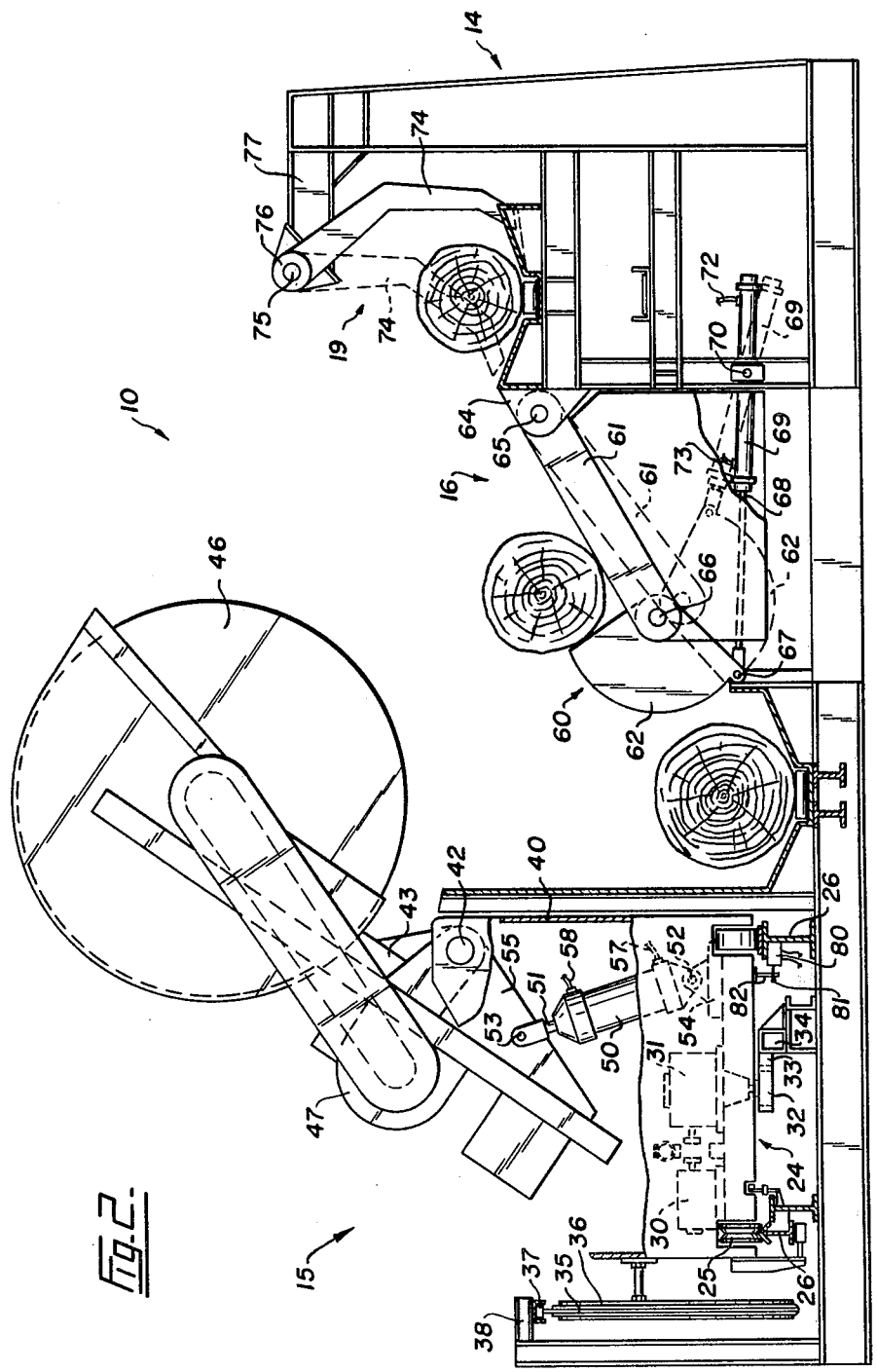

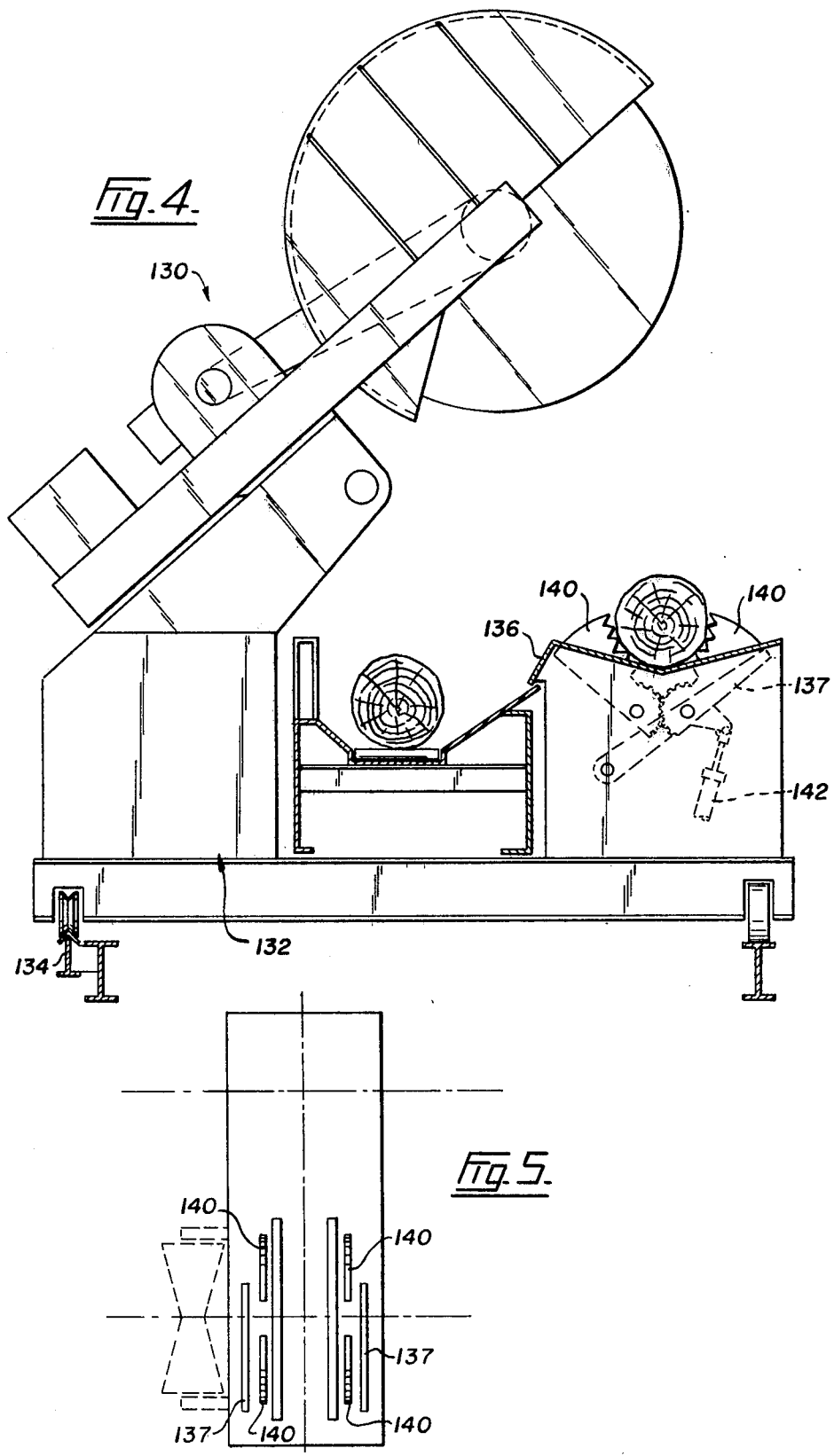

METHOD AND APPARATUS FOR SAWING LOGS INTO LENGTHS

BACKGROUND OF THE INVENTION

This invention relates generally to sawmill equipment and more particularly to a scanner-computer operated apparatus for sawing logs.

When logs are sawn into random or desirable lengths in a sawmill, it is important that the sawing or bucking operation as it is commonly referred to be performed with speed and accuracy. The first requirement, speed, is determined in part by the manner in which the logs are fed to the saws and how quickly the relative positions of one or more saws and often irregularly-shaped logs can be adjusted. There are two well known methods of moving logs into a position to be cut and these are known as lineal flow and transverse flow. With lineal flow, each log is moved longitudinally into a position where it is cut transversely by a saw. This provides for selective bucking of the logs which is an advantage but a disadvantage of lineal flow is the necessity of high speed movement of the logs to achieve a reasonable output. With the transverse flow, each log is moved transversely up to a plurality of fixed, laterally spaced saws and is adjusted longitudinally with respect to the fixed saws. The disadvantage of this method is loss of selective bucking within preset saw limits, while an advantage is the high volume that can be processed within a given time.

The known prior art includes the U.S. patents listed below and, of these references, the Warren and Arnelo U.S. patents appear to be the most relevant.

| | |
|---|---|
| 3,650,307 | Johnson |
| 3,459,246 | Attoson |
| 3,500,882 | Languay |
| 3,937,114 | Joensson |
| 3,960,041 | Warren |
| 3,554,249 | Arnelo |

SUMMARY OF THE INVENTION

The present invention overcomes or greatly reduces the disadvantages of the known lineal flow and transverse flow methods by combining the selective bucking achieved by lineal flow and the high volumes resulting from transverse flow with side shifting saws to ensure rapid sawing of the logs into proper lengths. As each log is moved up to the saws, it is scanned to obtain log profile data. This data includes length, diameter, taper, offset, crook, flair, uneven butt ends and the like. This profile data is fed into a computer having a memory with desirable cutting lengths data therein. One end of each log is located relative to a reference datum line or cutting plane. A computer compares the log profile data with the desirable cutting data and then causes a plurality of laterally spaced saws to be shifted relative to the reference datum line into positions which will cut the log into optimum random lengths. The logs are then sawn through for best recovery of the lumber contained in the several lengths and usually with only a minimum portions of the log later being reduced to wood chips. The method employs the apparatus in a series of steps which comprise scanning each log to obtain profile data thereof, feeding said profile data into a computer having a memory with desirable cutting lengths data therein, said computer comparing said profile data with said desirable cutting data, supporting the log at longitudinal intervals of its length in a position to be sawn, locating an end of the supported log to determine the position of said log relative to a reference datum line, and shifting a plurality of saws in the direction longitudinally of the log in accordance with the compared profile data and located log end to position said saws to cut the log into optimum random lengths relative to said profile data.

BRIEF DESCRIPTION OF THE DRAWING

FIG. 1 is a schematic plan view showing the general layout of the log-bucking apparatus, FIG. 2 is an end elevation of the apparatus with parts broken away and shown in section, FIG. 3 is a diagram used to explain the operation of the apparatus, FIG. 4 is an end elevation of another embodiment of the invention, and FIG. 5 is a schematic plan view of the FIG. 4 embodiment.

DESCRIPTION OF THE PREFERRED EMBODIMENTS

Referring to the drawings, the numeral 10 indicates generally log bucking apparatus constructed in accordance with a preferred embodiment of the present invention.

The apparatus 10 is provided with a suitable framework 14 on which the major parts of the invention are mounted. These major parts include a number of saw units 15 which are located alongside structure 16 for supporting each log as it is sawn or bucked into several lengths. An infeed conveyor 17 delivers the logs to a position alongside the support structure and an outfeed conveyor 18 carries away the bucked logs after they are dumped off the support structure for whatever further processing is required. The parallel infeed and outfeed conveyors move the logs longitudinally or end-to-end and this lineal flow normally is interrupted only long enough to allow the logs to be shifted laterally by transfer means 19 off the terminal end of the infeed conveyor 17 and onto the structure 16 where the logs are cut into random lengths by the saws.

The saw units generally indicated at 15 are arranged to move parallel to the outfeed conveyor 18 with five such units being illustrated in FIG. 1. It will be appreciated that a greater or lesser number of saw units may be employed depending on the overall length of the logs to be cut and the use to which the wood is to be put. Each unit 15 comprises a carriage 24 (FIG. 2) which is fitted with wheels 25, the wheels riding on rails 26 carried along one side of the framework. A separate drive means for each carriage comprises a reversible electric motor 30 mounted on the carriage 24 and, through a reduction 31, this motor is adapted to rotate a pinion 32 which meshes with a rack 33 secured to a framework part 34. The direct current electric motor 30 is connected by a flexible cable 35 to a suitable source of power (not shown) with the cable being wound on a reel 36. A carrier track 37 suspended below a framework part 38 allows the carriage 24 to travel back and forth along the track without hindrance from the cable. Thus, the plurality of saw units 15 are mounted for individual sideways movement along the rails which provide a common path of travel extending parallel to the outfeed conveyor 18.

The carriages 24 are each shown in FIG. 2 provided with side plates which form an open-topped body 40. A horizontal shaft 42 is carried at the top of the body 40 and a radial arm 43 is rockingly mounted on the shaft, this radial arm having an outer end normally projecting over the outfeed conveyor 18. A circular saw blade 46 is mounted in the normal manner on the outer end of the radial arm and an electric motor 47 is provided to rotate the blade at high speeds. The carriage 24 is equipped with a double-acting hydraulic cylinder 50 having a piston rod 51, see FIG. 2. Pivot pins 52 and 53 respectively connect this cylinder and piston rod to a part 54 on the carriage and a portion 55 of the radial arm 43. The cylinder 50 is included in a suitable hydraulic circuit represented by the hose lines 57 and 58 which appear in FIG. 2 only. The arrangement is such that when the cylinder is pressurized through the line 57 and the rod is extended, the blade 46 is rocked into cutting engagement with a log held by the support structure 16. Pressurizing the upper end of the cylinder 50 through the line 58 will swing the saw blade back to its original position. In the sawmill industry, this type of saw is often referred to as a "chop saw", and since it is quite well known, further detailed description is not considered necessary.

The structure generally indicated at 16 which supports the log as it is sawn is shown best in FIG. 2 to comprise a plurality of log holders 60. These log holders are spaced apart at regular intervals along the portion of the framework 14 which carries the terminal end of the infeed conveyor 17. Each holder includes a ramp 61 and a stop 62. The ramp, which desirably consists of two spaced arms, is secured to a bracket 64 on the side of the framework by a pivot pin 65. The opposite end of the ramp arms are connected by a pivot pin 66 to the stop 62 which has the shape of a quadrant. Still another pivot pin 67 connects the stop to a piston rod 68 of a double-acting hydraulic cylinder 69 secured to the framework by a trunnion mounting 70. The cylinder 69 is included in a hydraulic circuit having hose lines 72 and 73 which are shown in FIG. 2 only. Thus, the cylinder 69 is adapted to be pressurized so that extension of its rod 68 will move the log ramp 61 and the log stop 62 to the solid line positions shown in FIG. 2 whereby a log can be supported for sawing. Retraction of the rod 68 will collapse the log ramp and log stop so as to allow a sawn log to roll by gravity onto the outfeed conveyor 18. This arrangement provides each log holder 60 with a log-cradling position (shown by solid lines in FIG. 2) and a collapsed position which is shown by dotted lines in the same view. In the collapsed position, the ramp and the stops are clear of an approaching saw blade as it finishes a cut while the log is supported by the remainder of the log holders unless one or more of those are retracted as well.

The logs are moved off the end of the infeed conveyor 17 and onto the several log holders 60 by operation of the transfer means generally indicated at 19. In FIG. 2, the means 19 is shown to comprise a plurality of kickers 74 which are fixed to and suitably spaced apart on a shaft 75. This shaft is journalled in bearings 76 carried by a framework part 77. The arrangement is such that when the shaft 75 is partially rotated in one direction by suitable means, not shown, the kickers 74 swing clockwise (FIG. 2) and move a log laterally off the conveyor 17 so that it rolls down the several ramps 61 and comes to a halt against the several stops 62 of the log holders which, of course, are in the log-cradling position at this time.

The apparatus 10 is provided with detecting devices intended to initiate appropriate action whenever the saw units assume positions where their blades 46 might contact a part of an adjacent log holder 60 at the end of a cutting stroke. In FIG. 2, one such detecting device is shown as comprising a limit switch 80 which is mounted on one of the rails 26 directly opposite a log holder 60. This normally open switch has an operating lever 81 located in the path of a pin 82 depending from the underside of a carriage 24. Switch 80 is connected by suitable electric and hydraulic circuits to the cylinder 69. As the saw units are moved along the rails 26, one such unit may be halted opposite a log holder 60 which would then provide an obstruction for the blade of that unit. The foregoing arrangement, however, ensures that any log holder likely to be damaged by a saw blade traversing a log will be collapsed out of danger.

The apparatus 10 is designed to cut logs into random lengths in accordance with the respective profiles of the logs so that maximum use can be made of the wood as the log is sawn into lumber during a later and separate operation. In order to obtain the necessary profile data from the logs, the apparatus 10 includes a suitable scanning device which preferably is a lineal scanner such as is indicated by the numeral 100 in FIGS. 1 and 3. The scanner 100, which may be a conventional single or double axis type, is shown mounted on the infeed conveyor 17 and in a position whereby each longitudinally-moving log must pass through the scanner just prior to reaching a position alongside the support structure 16. During passage of each log; the scanner notes such details as the length, diameter, taper, offset, crook, flare, and uneven butt ends, etc. of the log.

The information gathered by the scanner 100 is relayed as input to a computer 105, see FIG. 3 only. This computer has a memory programmed with all the necessary desirable cutting data so that, based on the information received, a selection can be made by the computer as to what random lengths the log should best be cut into to make maximum use of the lumber.

FIG. 3 also shows the computer connected to a master control unit 110 which is mounted on a console (not shown) for the convenience of the operator of the apparatus 10. This unit 110 has the controls necessary for operating the apparatus independently and for overriding any of the saw-positioning decisions made by the computer and associated parts.

Both the computer 105 and the unit 110 are shown connected by the FIG. 3 circuitry to a saw control unit 115. The unit 115 functions as a setworks in that it receives imput from the computer and/or the master control unit 110 and energizes the several motors 30 in such a way as to adjust the positions of the saw units 15 as registered to cut a scanned log into optimum lengths.

The lengths selected by the computer are all related to a predetermined datum line 120 which is located on the apparatus to extend transversely of the log-supporting structure 16, see FIG. 1. It will be noticed that the reference datum line 120 is positioned near the terminal end of the conveyor 17 and that the forward end of a log being advanced by that conveyor is spaced a short distance from this line at the moment the transfer means 19 comes into operation. The appropriately timed operation of the means 19 is achieved by the provision of an electric eye as indicated generally at 121 in FIG. 1. The eye 121 comprises two units 122 located on opposite sides of the conveyor 17 near the datum line 120. These units provide a beam 123 which is broken by the log whereby the electric eye signals the means 19 to actuate the kickers thereby rolling the leg sideways onto the structure 16.

In order to determine the position of an end of a log in relation to the reference datum line 120, the apparatus 10 is provided with locating means generally indicated at 125 in FIGS. 1 and 3. This locating means is shown to comprise a "reachout" cylinder 126 having a piston rod 127 fitted with an end plate 128. When a log is dumped onto the holders 60, the cylinder 126 is pressurized so that the plate 128 is moved forward into engagement with the butt end of that log. A pressure-sensing device 129 is associated with the cylinder 126 whereby the distance the piston rod 127 is extended is noted and that information is transmitted to the computer 105 which takes the information into consideration in its determination of where the plurality of saw units should be located along the length of the previously scanned log.

The apparatus 10 operates to process the endwise moving logs as they are delivered by the infeed conveyor 17. A log assessed by the scanner 100 as it is moved forward by the conveyor 17 interrupts the electric eye 121 and is shifted by the kickers 74 onto the waiting holders 60. Next the locating means 125 determines the position of the adjacent log end with respect to the datum line 120. The computer 105 takes the profile data and the position of the log end into consideration and signals the saw units 15 to move as required. As soon as the saw units have taken up their required position, the cylinders 50 are pressurized whereby the several chop saws 15 operate to cut the log into optimum random lengths. If a particular unit 15 should be positioned so that its saw blade 46 might contact a part of the opposite log holder 60, then the limit switch 80 opposite the endangered log holder is actuated by that particular unit and the cylinder 69 is pressurized to collapse the obstructing holder and move it out of reach of the saw whereupon the log is supported by the remaining holders. All the holders are collapsed in unison to dump the saw log onto the outfeed conveyor 18 and this dumping action may also be controlled by the operator at the master control console.

Another embodiment of the present invention is shown in FIGS. 4 and 5. This embodiment comprises a plurality of saw units 130 which are each mounted on a carriage 132 riding on rails 134. Each carriage supports a stand 136 which is fitted with a power-operated kicker 137 for shifting a sawn log off the stand onto the outfeed conveyor 18. Also a pair of clamps 140 are provided on each stand, the clamps being operated by a cylinder and piston rod arrangement 142 to grip and support a log as it is sawn into random lengths. The log kicking and clamping members on each stand are spaced apart as shown in FIG. 5 so that the blade of an adjacent saw is not obstructed at the end of a cutting stroke.

We claim:

1. Apparatus for cutting logs into random lengths in accordance with the respective profiles of the logs to obtain advantageous use of the wood therein, said apparatus comprising:
   a plurality of saw units laterally spaced apart and mounted for individual sideways movement along a common path of travel,
   drive means for moving each saw unit,
   a support structure for supporting a log delivered thereto in a position to be sawn into lengths by the saw units,
   locating means for locating an end of the log on the support structure and determining the position of said log end relative to a reference datum line extending across said structure,
   scanning means for scanning the log delivered to the support structure whereby to obtain profile data of the log, and
   a computer having a memory with desirable cutting data therein; said computer being operatively connected to the locating means, the drive means, and the scanning means whereby the saw units are positioned relative to the reference datum line to cut the log into optimum random lengths.

2. Apparatus as claimed in claim 1, in which said support structure comprises a plurality of log holders spaced apart to support the log at intervals along the length thereof, said log holders each having a log-cradling position and a collapsed position clear of the log, operating means for shifting each log holder to either of the aforesaid positions, and a detecting device located opposite each log holder in a position to be actuated by the saw units, said detecting devices each being operatively connected to the operating means of an opposite log holder whereby said opposite log holder is shifted to the collapsed position when a saw unit is moved to a log-sawing position which would otherwise bring it into contact with said opposite log holder in the log-cradling position.

3. Apparatus as claimed in claim 1, in which each saw unit comprises a carriage supporting a chop saw having a saw blade, said support structure comprising a stand mounted on each carriage opposite the chop saw, and a log-clamping mechanism mounted on each stand in a position to clamp the log alongside the saw blade when said chop saw is actuated to rock said blade into cutting engagement with the log.

4. Apparatus for cutting logs into random lengths in accordance with the respective profiles of the logs to obtain advantageous use of the wood therein, said apparatus comprising:
   a plurality of chop saws each mounted on a carriage adapted to travel longitudinally of a log, said chop saws each having a circular saw blade and being operable to swing said blade through cutting and return strokes across the log,
   drive means for shifting the carriages laterally towards and away from one another,
   a plurality of log holders spaced apart to support the log at intervals along the length thereof, said log holders each having a log ramp and a log stop movable to provide said log holder with a log-cradling position and a collapsed position clear of the log,
   operating means for shifting the log holders between the log-cradling and collapsed positions,
   a detecting device for actuating each operating means to shift the associated log holder to the collapsed position when said holder is an obstruction to the circular saw blade of an adjacent chop saw,
   a locating device for locating an end of the log on the plurality of log holders and determining the position of said log end relative to a reference datum line extending transversely of the log, scanning means for scanning the log delivered to the plurality of log holders whereby to obtain profile data of the log, and a computer having a memory with desirable cutting data thereon, said computer being operatively connected to the locating device, the drive means and the scanning means whereby the plurality of chop saws are positioned relative to the reference datum line to cut the log into optimum random lengths.

5. Apparatus as claimed in claim 4, and including an infeed conveyor for moving logs lineally up to a position alongside the plurality of log holders, transfer means for shifting the logs laterally off the infeed conveyor onto the plurality of log holders, and electric eye means located near the infeed conveyor adapted to detect the passing of an end of a log and initiate operation of the transfer means.

6. Apparatus as claimed in claim 5, and including an outfeed conveyor for receiving the random lengths from the plurality of log holders and for moving said lengths lineally away from the apparatus.

7. A method for cutting logs into random lengths in accordance with the respective profiles of the logs to obtain advantageous use of the wood therein, said method comprising the steps of:

scanning each log to obtain profile data thereof, feeding said profile data into a computer having a memory with desirable cutting length data therein, said computer comparing said profile data with said desirable cutting data, supporting the log at longitudinal intervals and in a position to be sawn, locating an end of the supported log to determine the position of said log end relative to a reference datum line, and shifting a plurality of saws in the direction longitudinally of the log in accordance with the compared profile data and located log end to position said saws to cut the log into optimum random lengths relative to said profile data.

8. The method as claimed in claim 7, and including the additional step of withdrawing support of the log at any longitudinal interval being approached by an adjacent saw unit when executing a cutting stroke.

9. The method as claimed in claim 8, and including the additional step of moving the log up to and beyond the scanning position.

10. The method as claimed in claim 9, and including the additional step of moving the sawn log endwise away from the sawing position.

* * * * *